G. LAND.
MEANS FOR REGULATING THE INTAKE OF WATER IN SIPHONIC FLUSH TANKS.
APPLICATION FILED JUNE 3, 1911.
1,031,127.
Patented July 2, 1912.
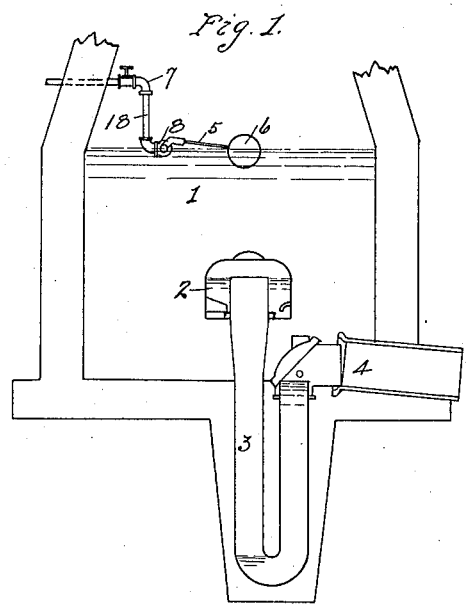
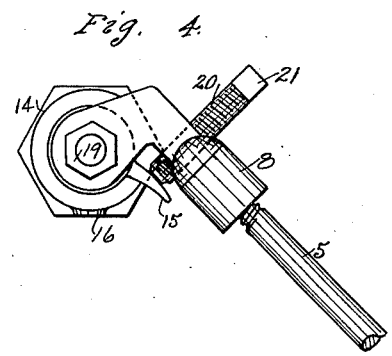
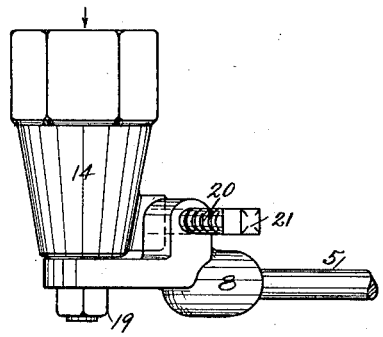
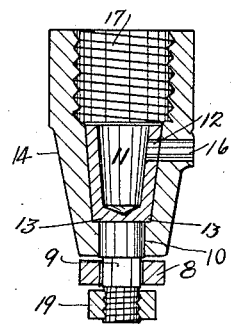
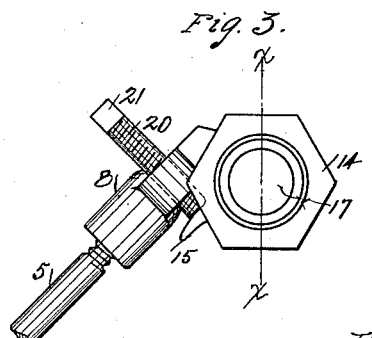

UNITED STATES PATENT OFFICE.

GORDON LAND, OF SEATTLE, WASHINGTON, ASSIGNOR TO L. HOWARD SMITH.

MEANS FOR REGULATING THE INTAKE OF WATER IN SIPHONIC FLUSH-TANKS.

1,031,127. Specification of Letters Patent. Patented July 2, 1912.

Application filed June 3, 1911. Serial No. 631,132.

*To all whom it may concern:*

Be it known that I, GORDON LAND, a citizen of the United States, and a resident of Seattle, in the county of King and State of Washington, have invented certain new and useful Improvements in Means for Regulating the Intake of Water in Siphonic Flush-Tanks.

The principal object of my invention is to provide simple and inexpensive means to regulate the intake of water into an ordinary siphonic flush tank, having a wide range of manual adjustability of an infinite number of minute degrees, and when once manually adjusted will thereafter automatically regulate the inflow of water so as to cause the rate of inflow to remain constant until the tank is nearly filled and from that time on to rapidly increase for a considerable period before the siphonic action begins so as to effectually flush the intake pipe and valve, which in flush tanks, must of necessity be relatively small and especially liable to be clogged up from impure water. It will be appreciated that in siphonic flush tanks when the equilibrium or balance of the water levels is about to be disturbed a few drops of water only are necessary to break the siphon and flush the sewer and that if leaks exist in the tank, due to defective workmanship or deterioration such leaks are sometimes partially closed by sediment and at other times entirely open which causes the siphon to break at irregular intervals instead of at the pre-determined periods.

An important feature in my present invention is that, due to the fact that the maximum inflow exists co-incidentally with this critical period, the variation in the siphonic action is not nearly so great as if the inflow were constant.

A second important feature is that in order to more firmly seat the valve and prevent leakage there, advantage is taken not only of the static force of the water but of its velocity as it flows through the pipe, the impact occurring directly against the valve plug itself and without any loss caused by undue friction of the water against the walls of the valve chamber, as distinguished from constructions already known in the art, in which the water enters the valve chamber at an angle to the plane of movement of the valve plug and for that reason first impinges against the walls of the valve chamber instead of directly against the valve plug.

A third important feature, especially in the matter of assembling, is that the same opening serves the purpose of water intake from the pipe as well as to admit the valve plug, thereby reducing the parts, the labor of assembling as well as machining.

A patentable feature is also believed to exist in the means for manually adjusting the valve so that the same may not be readily tampered with without the use of a wrench or other tool.

Other objects and features will appear as the invention is more fully disclosed in the following specification, and shown in the accompanying drawings in which—

Figure 1 is a fragmentary, vertical view of an ordinary siphonic flush tank with my device applied thereto. Fig. 2, an enlarged plan view of the device with parts broken away. Fig. 3 a side elevation of the same looking in the direction of the arrow in Fig. 2. Fig. 4, a side elevation looking in the opposite direction. Fig. 5 a longitudinal sectional view substantially on the line X—X of Fig. 3.

Referring now more particularly to the drawings, the numeral 1 designates an ordinary siphonic flush tank, 2 the bell, 3 the siphon tube, 4 the sewer connection, 5 the pivoted arm to which is attached the floating bulb 6, 7 the faucet or inlet, all of usual construction.

8 is an arm pivotally secured to the reduced annular portion 9 of the stem 10 of the hollow cone 11 in which cone is the opening 12. The cone 11 seats upon the annular shoulder 13, and the relation of the shoulder 13 is such that a firm seating of the cone against the same occurs simultaneously with the contact of the peripheral outer surface of the cone 11 with the interior walls of the casting 14 which is bored conically to correspond to the cone 11. Projecting from the casting 14 is the ledge 15 and through the wall of the casting 14 is the opening 16 which is in the plane of the circular path of the opening 12 in the cone 11 as the latter revolves in the casting 14. The enlarged end 17 of the casting is internally threaded as shown, to receive the supply pipe 18. When the parts are assembled the same are held in place by the nut 19. The arm 8 is bored and threaded to receive the set-screw 20, the female threads being overmatched with the male threads, that is to say the threads fitting each other much more tightly than would be necessary for ordinary use, so that much more force is required to turn the set-screw 20 than would otherwise be the case. The square head 21 is also purposely employed instead of a thumb nut or other such means so that the set-screw 20 cannot be turned or tampered with without use of a wrench or like tool.

From the foregoing it is believed that my devices will be fully understood by those skilled in the art. It is clear that the arm 5 can be elevated with relation to the casting 14 by means of the adjusting set-screw 20, thus revolving the cone 11 in the casting 14 until the opening 12 registers with the opening 16 to the desired extent, and that the water as it rushes through the pipe 18 will fill the cone 11 impacting directly against the bottom thereof and causing the same to firmly seat itself upon the annular shoulder 13 and that notwithstanding this firm seating of the cone the same will readily turn within the casting on account of the minimum friction between the relatively narrow shoulder 13 and the smaller end of the cone and that as the water, escaping through the openings 12 and 16, gradually fills up the tank 1, the arm 5 remains in its manually adjusted position until the level of the water in the tank reaches the bulb 6 when the latter will rise with the water carrying the arm 5 upwardly and causing the openings 12 and 16 to come more and more into register with each other and allowing a greater and greater discharge of water therethrough which effectively flushes the pipe 18, cone 11, openings 12 and 16, until the difference of the water level in the tank 1 and that in the bell 2 equals the difference between the levels of water in the shorter leg of the siphon and that in the longer leg thereof, when the siphonic action begins and the water instantly descends in the tank and allows the bulb 6 and arm 5 to descend to their predetermined manually adjusted positions. When the water levels are approximately as shown in Fig. 1, a few added drops of water only are necessary to cause the siphonic action and if leaks exist in the walls of the tank the same may be partially closed at times by floating sediment and at other times open causing the siphonic action to be delayed if the discharge of water from the pipe 18 is always the same; but, due to the increased inrush of water, at this critical period, through the now fully registered openings 12 and 16, such delay is greatly lessened.

While I have shown and described a particular form of embodiment of my invention I am aware that many changes in the details thereof will readily suggest themselves to others skilled in the art without departing from the spirit and scope of the invention and I do not therefore desire to be limited to the exact form shown.

What I claim as new and desire to protect by Letters Patent of the United States is—

1. In inlet controlling means for siphonic flush tanks a conically bored outer casing having one of its ends internally threaded to receive an intake pipe and its opposite end provided with an annular internal shoulder, a hollow conical valve plug open toward said intake pipe and revoluble within said outer casing and having a slight longitudinal movement with relation thereto, whereby the water impacts directly against said plug to firmly seat the same against said shoulder, outlets one in said valve plug and one in said outer casing adapted to register with each other, a float arm secured to said valve plug and means for manually adjusting the lowermost position of said float arm.

2. In inlet controlling means for siphonic flush tanks a conically bored outer casing internally threaded at its larger end, a hollow valve plug open toward said larger end and revoluble within said casing and slightly movable longitudinally thereof, an annular seat for the inner end of said plug having a definite relation to the outer walls of said plug and the inner walls of said casing, an outlet in said valve plug and an outlet in said outer casing adapted to register with each other, a stem upon said valve plug revolubly mounted in one end of said outer casing, an arm secured to said stem, means for manually adjusting said arm vertically with relation to said outer casing said means including a tightly fitting set screw operable only with a wrench, and a float upon the free end of said arm.

3. In inlet controlling means for siphonic flush tanks a conically bored outer casing having one of its ends threaded to receive an intake pipe and an annular valve seat within its opposite end, a hollow conical valve plug open toward said intake pipe and revolubly mounted within and having a slight longitudinal movement with relation to said outer casing, the outer walls of said plug having a definite relation to said valve seat and the inner walls of said outer casing;

a stem upon said valve plug, openings one in said valve plug and one in said outer casing adapted to register with each other, an arm secured to said stem, a set screw passing through said arm and having tightly fitting threads and a relatively small head, a ledge upon said casing upon which the end of the set screw rests and a float upon the free end of said arm.

GORDON LAND.

Witnesses:
FRED P. GORIN,
H. RUPERT.

Copies of this patent may be obtained for five cents each, by addressing the "Commissioner of Patents, Washington, D. C."